United States Patent [19]
Tamura et al.

[11] Patent Number: 5,585,888
[45] Date of Patent: Dec. 17, 1996

[54] METHOD AND DEVICE FOR PRINTING FILMS

[75] Inventors: Hiroaki Tamura; Toshio Takumi, both of Wakayama, Japan

[73] Assignee: Noritsu Koki Co., Ltd., Wakayama, Japan

[21] Appl. No.: 500,460

[22] Filed: Jul. 10, 1995

[30] Foreign Application Priority Data

Jul. 8, 1994 [JP] Japan .................................. 6-157146

[51] Int. Cl.⁶ .................................................. G03B 27/62
[52] U.S. Cl. .............................. 355/75; 355/77; 242/337
[58] Field of Search ........................... 355/18, 40, 48, 355/75, 77, 41; 242/337, 337.1; 352/73, 124, 129

[56] References Cited

U.S. PATENT DOCUMENTS

| | | | |
|---|---|---|---|
| 4,203,664 | 5/1980 | Clifton et al. | 355/64 |
| 4,204,733 | 5/1980 | Modney et al. | 355/64 |
| 4,676,710 | 6/1987 | Shiraishi | 414/225 |
| 5,041,853 | 8/1991 | Kiejzik | 354/88 |
| 5,541,897 | 7/1996 | Baca et al. | 369/37 |

FOREIGN PATENT DOCUMENTS 0565490  10/1993  France .

Primary Examiner—R. L. Moses
Assistant Examiner—Shival Virmani
Attorney, Agent, or Firm—Wenderoth, Lind & Ponack

[57] ABSTRACT

Cartridges containing films are inserted into respective cartridge holders on the rotary table. It is rotated to feed films to image the data readout unit and the printing/exposure unit arranged along a straight line. The driving force for rotating the rotary table is distributed to open and close the film cartridges, feed and stop them and open and close the doors of the cartridges holders. All are mechanically done from the same driving source.

5 Claims, 12 Drawing Sheets

METHOD AND DEVICE FOR PRINTING FILMS

BACKGROUND OF THE INVENTION

This invention relates to a method and a device for printing films housed in cartridges.

A conventional device for printing images on a film onto printing paper has a scanner unit and a printing/exposure means arranged along a film feed unit for feeding films in a straight line. The scanner unit reads printing conditions such as image density from a film before printing it. Based on the data thus obtained, the light from a light source is adjusted with a light adjusting filter and the thus adjusted light is used to print film images onto printing paper.

To print films with this type of printers, films have to be pulled out of and detached from cartridges. The films are then fed into the film feed unit as it is or after splicing them in a roll form.

With the conventional device, while the scanner unit is reading image density and other printing data of one film, the printing/exposure unit cannot print another film. While the latter is printing one film, the former cannot read printing data of another film. In other words, these units cannot be driven concurrently, so that the processing speed was insufficient. In order to increase the processing speed, it was proposed to drive the above two units independently of each other and to provide a loop guide therebetween to adjust the film feed rate.

When printing developed films, they may be fed in strips or in a roll after separating them from cartridges. Otherwise, they may be processed without separating them from cartridges. But in order to process films without detaching them from cartridges, a separate driving unit is needed to unwind and rewind films from and into cartridges.

An object of this invention is to provide a method and device for printing films which can print one film in a printing/exposure unit while reading image data in a scanner unit by using a rotary table, which need no separate driving means for opening and closing doors of cartridges mounted on the rotary table and no wire connecting work.

SUMMARY OF THE INVENTION

According to the present invention, there is provided a method of printing films with a plurality of cartridge holders for holding cartridges each accommodating a film provided on a rotary table, the method comprising the steps of feeding films from the respective cartridges into an image data readout unit and a printing/exposure unit arranged along a straight line passing the center of the rotary table to read out image data on one film and simultaneously print another film, rewinding said films into the cartridges, and feeding the cartridges to the next stations, wherein the driving forces necessary to open and close the cartridges, feed and stop the cartridges, and open and close the doors of cartridge holders are derived from the driving force for driving the rotary table.

According to the present invention, there is provided a device for printing films comprising a rotary table, an image data readout unit and a printing/exposure unit arranged along a straight line passing the center of the rotary table, the rotary table having a rotary-drive unit for converting an external force to a force for rotating the rotary table, and a plurality of cartridge holders for housing cartridges each containing a film, the each cartridge holder comprising a pair of side plates for holding a cartridge therebetween, a means for moving the side plates toward and away from each other, and a means provided on the side plates for opening and closing a door of each cartridge, wherein the driving force for driving the rotary-drive unit is also used to drive said means.

In a preferable arrangement, the side plates carry a driving means for unwinding and rewinding films from and into cartridges, the driving unit being driven by an external drive unit through a transmission means which engages at a predetermined position.

In another arrangement, a cartridge/film guide means is provided at a cartridge loading position on the rotary table. In this case, the driving force for driving the rotary table is also used to drive the guide means.

According to the present invention, a plurality of cartridges set in the cartridge holders mounted on the rotary table are sent to the respective film processing stations one after another. Films in the cartridges are unwound at the scanner unit, so that it can efficiently and continuously read image data and magnetic data of films.

When the scanner unit finishes reading data of one film, the film is rewound into the cartridge. The rotary table is then turned to send the cartridge to the printing/exposure unit, where the film is again unwound from the cartridge for printing.

The rotary-driving force for driving the rotary table is converted to forces for feeding cartridges, and opening and closing doors of cartridges when reading image data and printing films.

The film printer according to the present invention is a device for carrying out the film printing method according to the present invention. This device has a means for distributing the force of the driving unit, such as a motor, provided outside the rotary table for rotating the rotary table to the driving unit mounted on the rotary table. Thus, there is no need to mount a motor on the rotary table. No wiring work is needed, either.

According to the present invention, the side plates carry a driving means for unwinding and rewinding films from and into cartridges, the driving unit being driven by an external drive unit through a transmission means which engages at a predetermined position. Thus, there is no need to mount a separate electric motor on the rotary table to unwind and rewind films from and into cartridges. No wiring work is needed, either.

According to the present invention, a cartridge/film guide means is provided at a cartridge loading position on the rotary table. At the loading position, the guide means is released so that a cartridge can be loaded onto the rotary table using this guide means as a cartridge loading guide. At other positions, the guide means is used to guide a film being unwound from or rewound into a cartridges. It also serves as a locking means for keeping the cartridge locked in the cartridge holder. Thus, at the cartridge loading position, cartridges can be smoothly loaded onto the rotary table, while at the image information readout position and the printing/exposure position, films can be smoothly unwound from and rewound into cartridges while keeping the cartridges retained in the cartridge holders.

Other features and objects of the present invention will become apparent from the following description made with reference to the accompanying drawings, in which:

Figure 1:
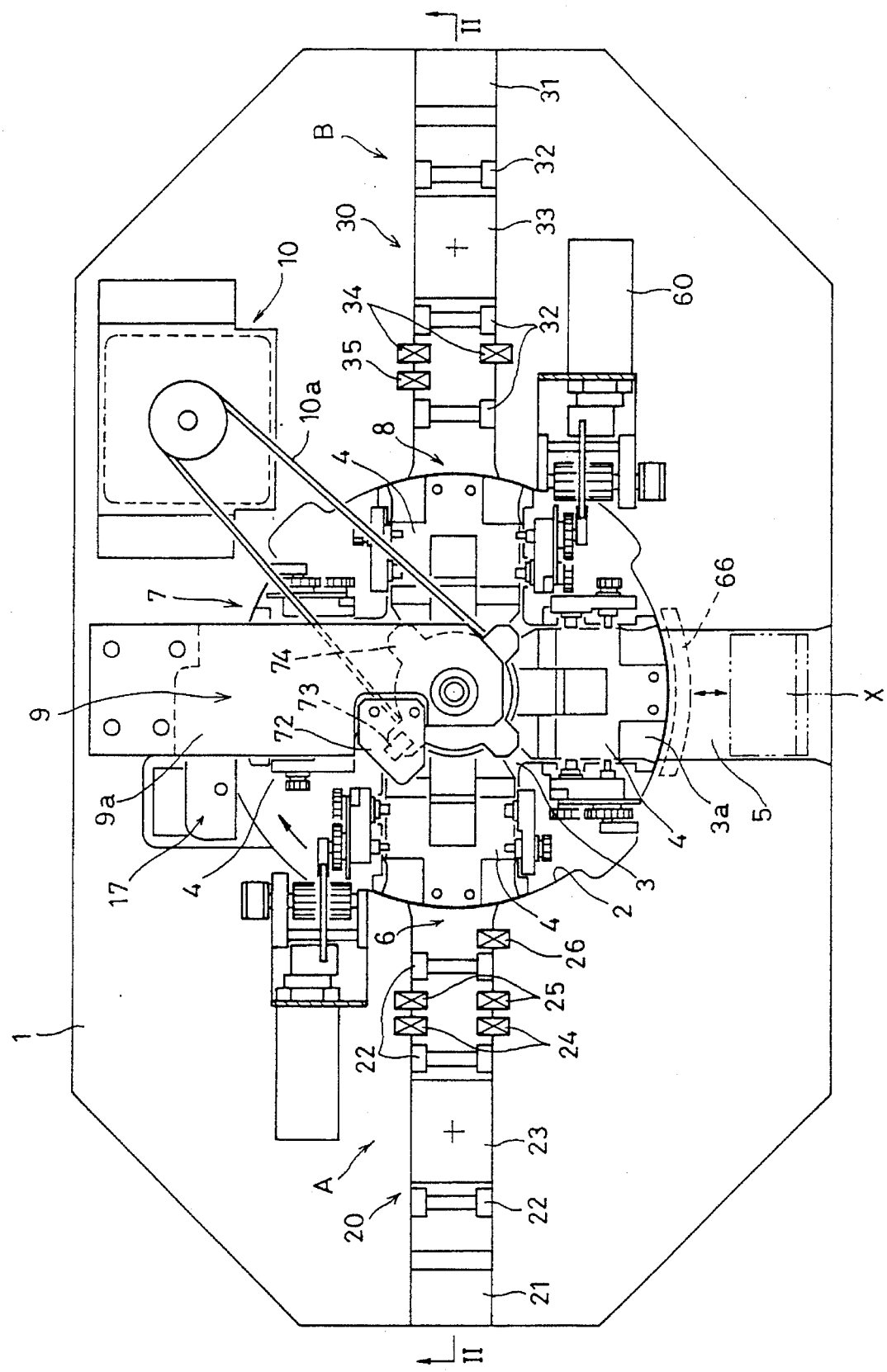
FIG. 1 is a schematic plan view of the entire film printer of the embodiment.

Referring to the drawings, an embodiment of this invention is described.

DETAILED DESCRIPTION OF THE PREFERRED EMBODIMENT

Figure 2:
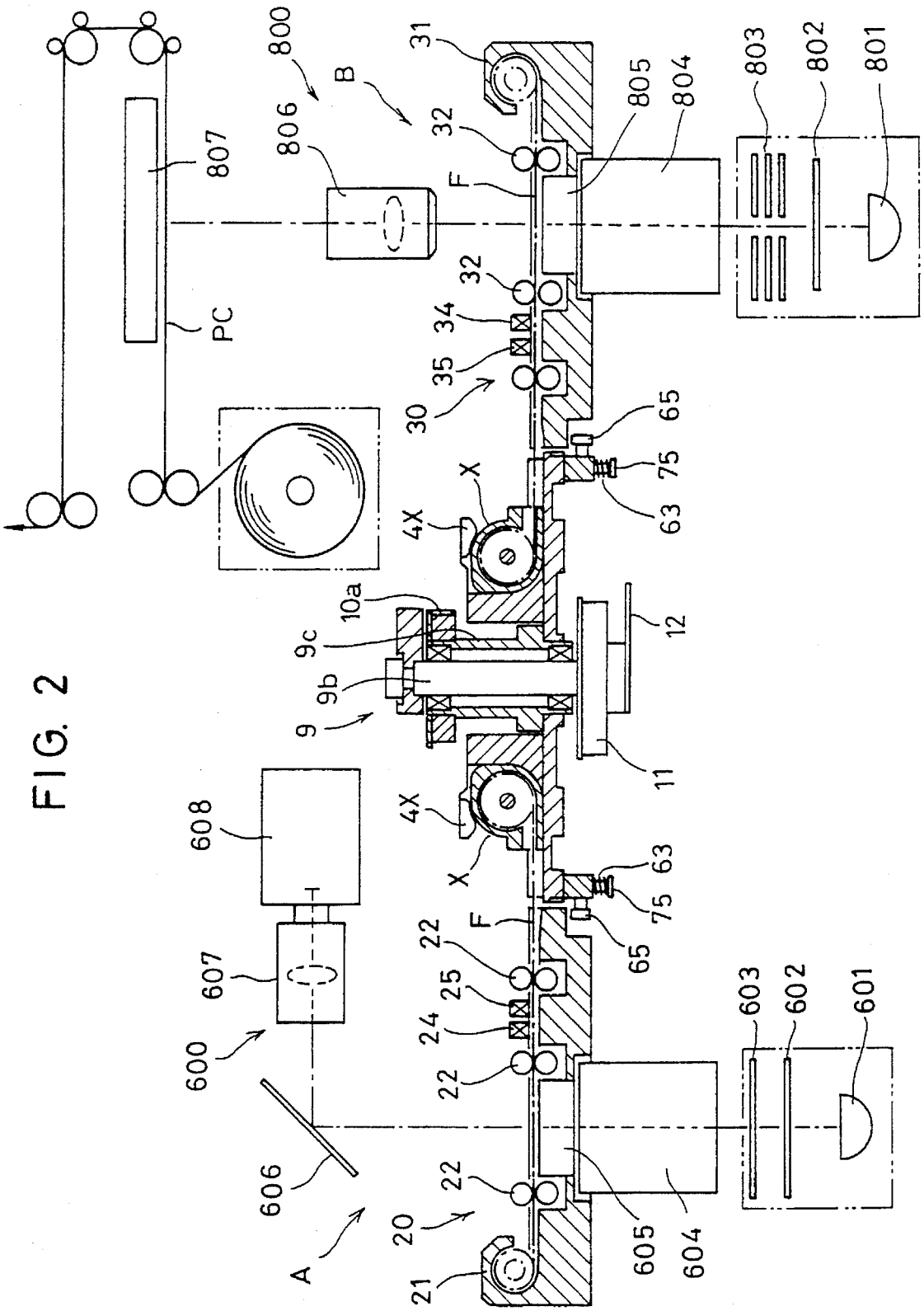
FIG. 2 is a sectional view taken along line II—II of FIG. 1.

FIG. 1 schematically shows the entire film printer embodying the invention. FIG. 2 is a sectional view taken along line II—II of FIG. 1. The printer comprises a base plate 1 having a round hole 2 in the center, and a rotary table 3 rotatably mounted in the hole 2 and carrying a plurality of (four in the embodiment) cartridge holders 4 for receiving cartridges X.

Cartridges X are loaded in the respective cartridge holders 4 at a loading position 5. With cartridges X loaded in the holders 4, the rotary table 3 is rotated in the direction of arrow to move each cartridge to an image data readout position 6, an intermediate position 7, and a printing/exposure position 8. The rotary table 3 is rotatable about the axis of a rotation support unit 9, while kept horizontal by the unit 9. The rotary table 3 is rotated by a motor of a driving unit 10 through a belt 10a.

The rotary table 3 comprises two elongated plate members crossing each other at a right angle and having arcuately edged end portions 3a so as to snugly fit in the circular opening 2. The cartridge holders 4 are each mounted on the respective end portions 3a.

Before discussing various members mounted on the rotary table 3, we will briefly describe an image data readout unit A and a printing/exposure unit B shown in FIGS. 1 and 2. The device of this embodiment is similar to conventional printers in that these two units are arranged along a straight line (though conventional printers have no rotary table 3 therebetween).

As shown in FIG. 1, the image data readout unit A has a film feed unit 20 and a scanner unit 600 (FIG. 2) for reading out image data on films through a scanner opening 23.

The film feed unit 20 comprises a film winder 21, feed rollers 22, the scanner opening 23, a bar code detector 24, a magnetic head 25 and a perforation detector 26.

As shown in FIG. 2, when the rotary table 3 stops with one of the cartridge holders 4 in alignment with the image data readout unit A, the film F in the cartridge X received in this cartridge holder is unrolled from the cartridge and fed by feed rollers 22 through the magnetic head 25 and the bar code detector 24, passing over the scanner opening 23, where its image data are read out, and wound into the film winder 21. The film is stopped temporarily when each frame of the film comes right over the scanner opening 23 to read the image information on each frame. Namely, the film is fed intermittently. After reading image data on all the frames of the film, it is rewound into the cartridge X.

As shown in FIG. 2, the scanner unit 600 comprises a light source 601, a light-adjusting filter 602, a shutter 603, a mirror tunnel 604, a scanner opening 605, a reflecting mirror 606, a lens 607, and a scanner 608. Since this scanner unit is an ordinary one, we will omit its detailed description.

As shown in FIG. 1, the printing/exposure unit B, provided on the other side of the rotary table, comprises a film feed unit 30, and a printing unit 800 for printing images on the film F onto a web of printing paper PC. Images on the film are transferred to the printing paper through a printing/exposure opening formed along the film feed unit 30.

As shown in FIGS. 1 and 2, the film feed unit 30 comprises a film winder 31, feed rollers 32, a printing/exposure opening 33, a magnetic head 34, and a perforation detector 35.

The printing unit 800 comprises a light source 801, a heat-absorbing filter 802, a light-adjusting filter 803, a mirror tunnel 804, a printing/exposure opening 805, a lens 806 and a paper mask 807. The printing unit is also an ordinary one, so that we will omit its detailed description.

The film feed units 20 and 30 are separate members and driven independently of each other. Thus, it is possible to read image data of a film housed in one cartridge while printing a film housed in another cartridge. Thus, the printer of the invention can process films with higher efficiency.

Figure 3:
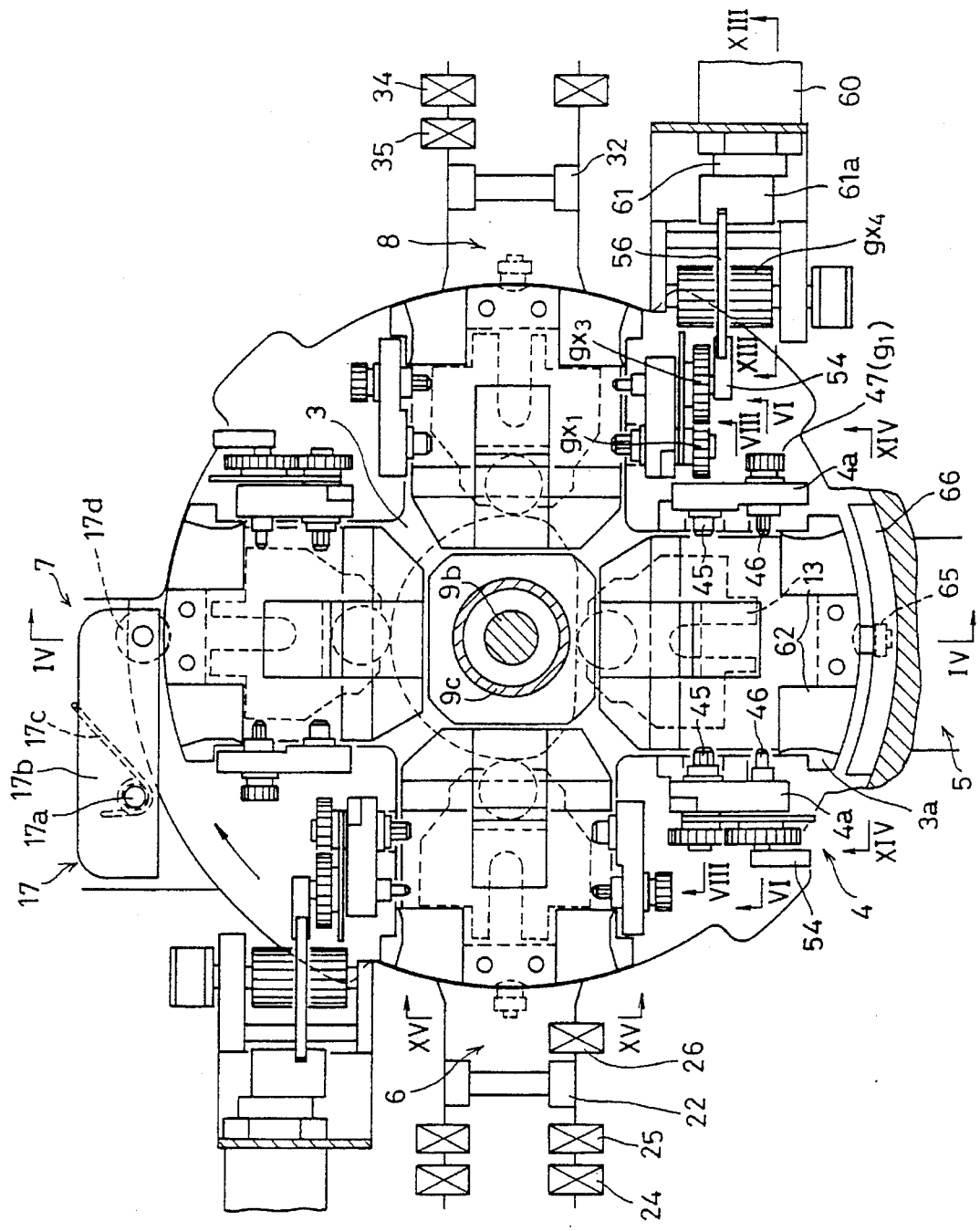
FIG. 3 is an enlarged plan view around the rotary table of the same.
Figure 4:
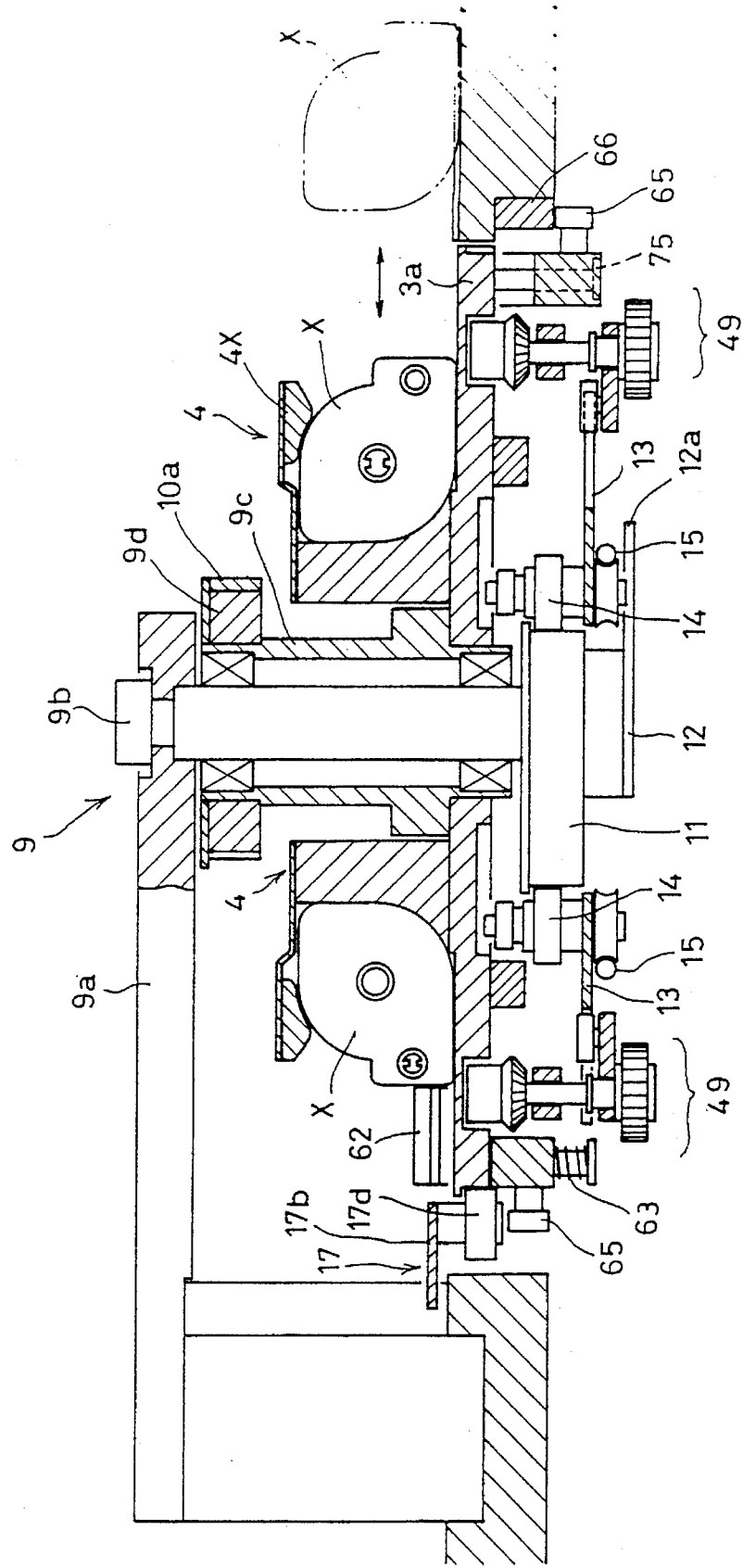
FIG. 4 is a sectional view taken along line IV—IV of FIG. 3.

FIG. 3 is an enlarged plan view around the rotary table 3. FIG. 4 is a sectional view taken along line IV—IV of FIG. 3. As shown in these figures, the rotation support unit 9 comprises an L-shaped arm 9a, a vertical shaft 9b fixed to and suspended from one end of the arm 9a, and a hollow rotary shaft 9c rotatably mounted around the vertical shaft 9b. The rotary table 3 is fixed to the bottom end of the rotary shaft 9c. The belt 10a engages a pulley 9d secured to the top end of the rotary shaft 9c. The arm 9a is secured at the other end to the base plate 1.

Figure 5:
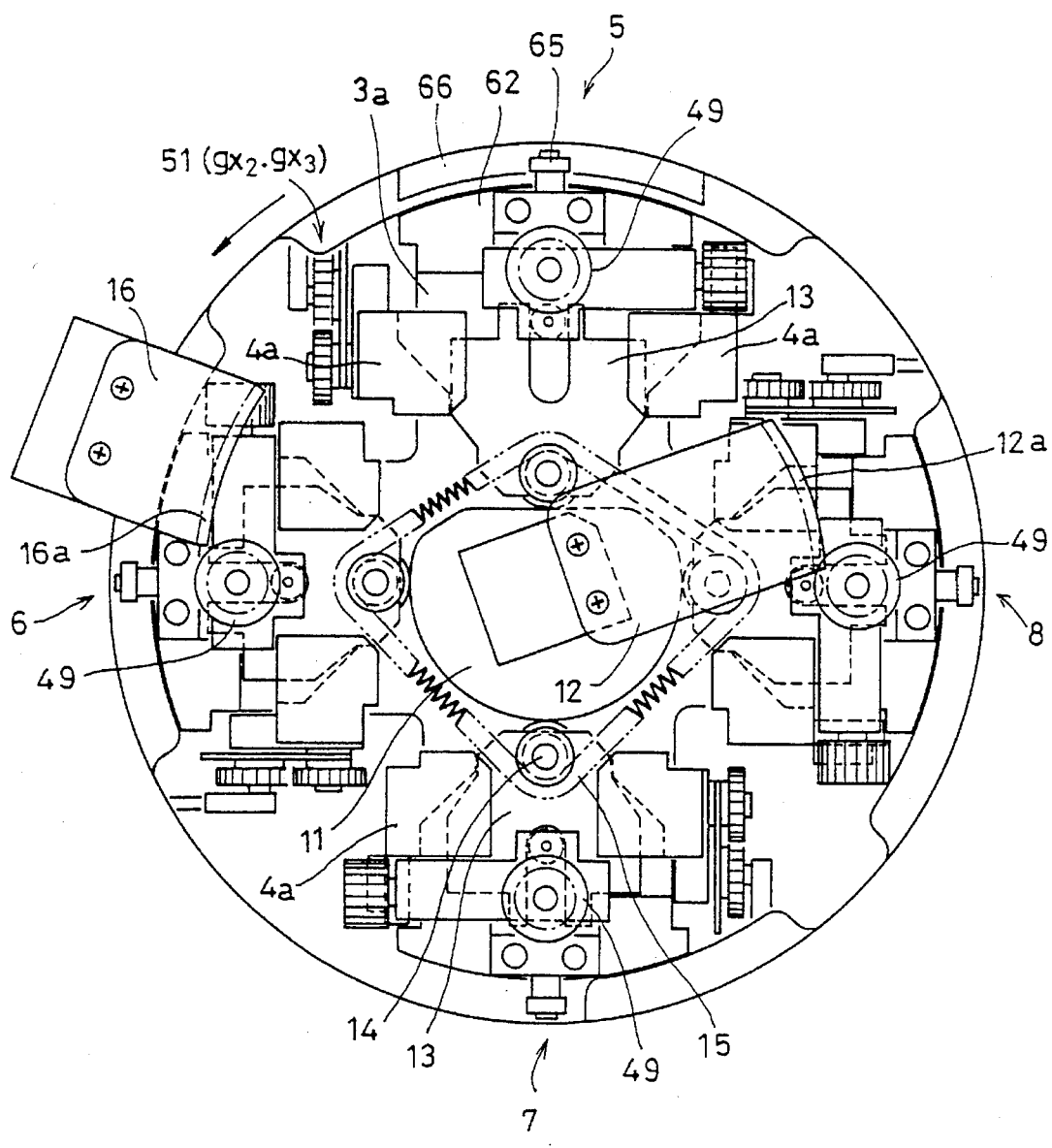
FIG. 5 is a bottom view corresponding to FIG. 3 but seen from the backside of rotary table.

A cam plate 11 is fixed to the bottom of the vertical shaft 9b. It carries a rack plate 12 on the bottom. FIG. 5 is a bottom plan view seen from the back of FIG. 3. It shows the detailed structure of the cam plate 11 and the rack plate 12. As will be apparent from FIGS. 3 and 5, the cam plate 11 is a half-moon-shaped member. Contact rollers 14 mounted on the inner ends of restrictor plates 13 are pressed against the outer peripheral surface of the cam plate 11 by a resilient member 15.

Figure 6:
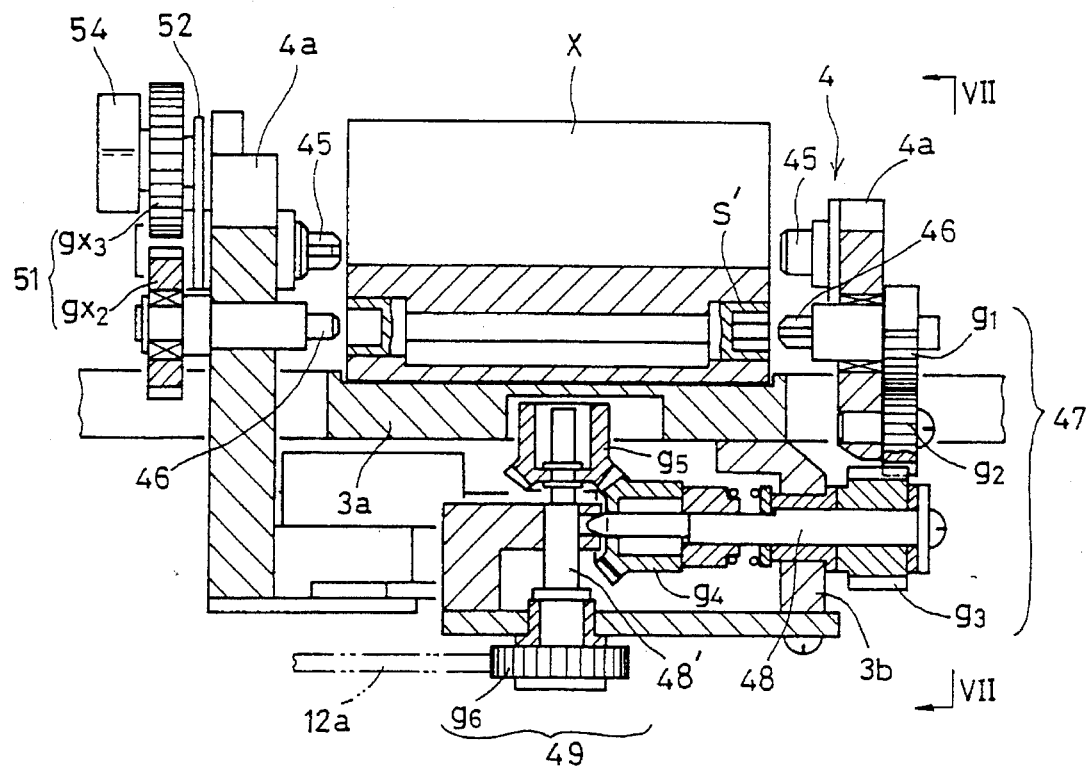
FIG. 6 is a sectional view taken along line VI—VI of FIG. 3.
Figure 7:
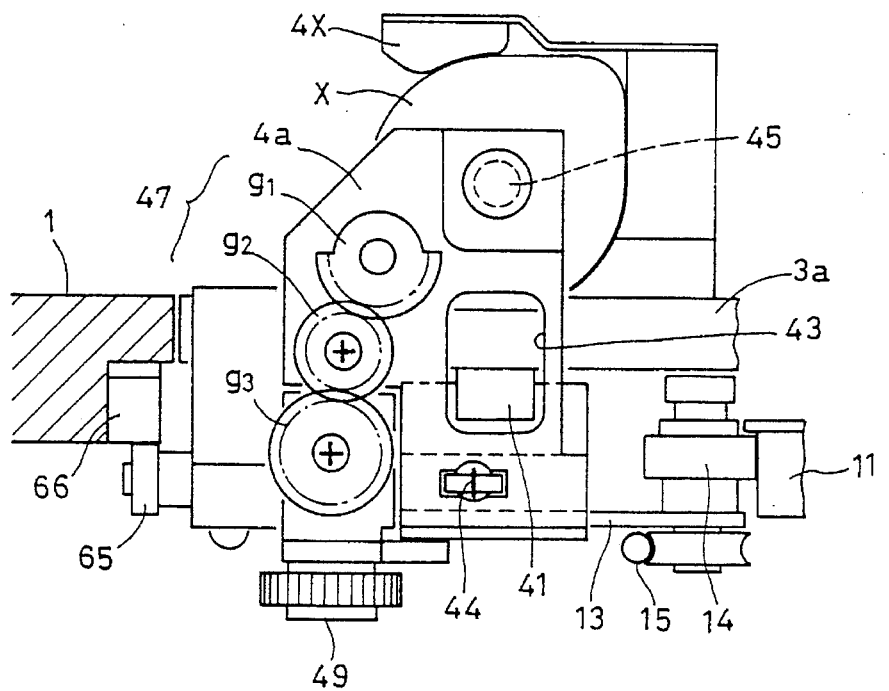
FIG. 7 is a sectional view taken along line VII—VII of FIG. 6.
Figure 8:
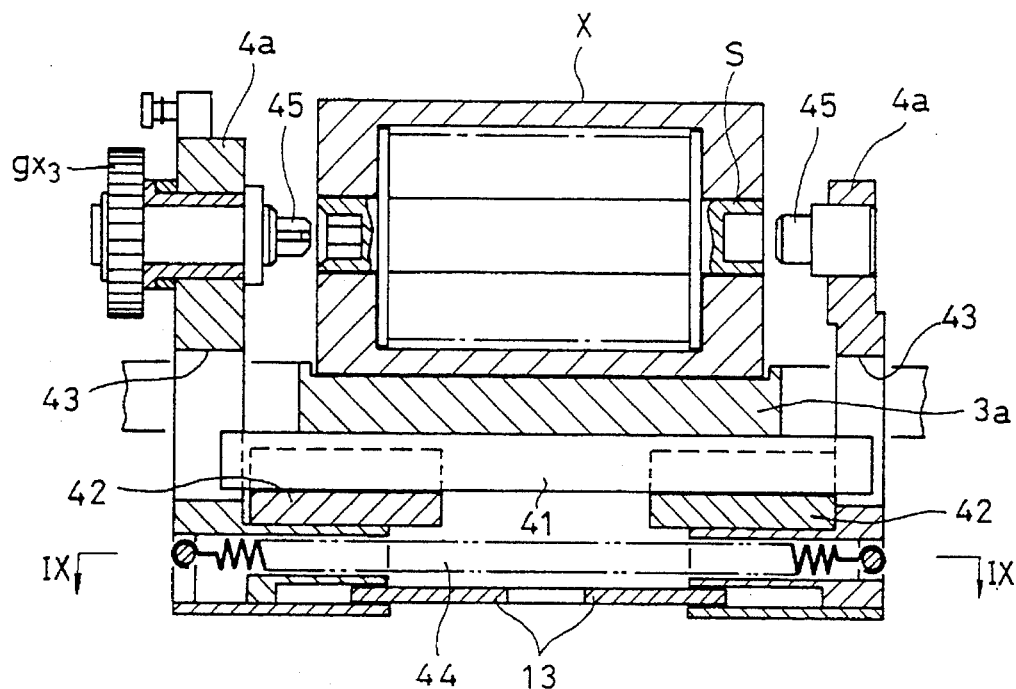
FIG. 8 is a sectional view taken along line VIII—VIII of FIG. 3.
Figure 9:
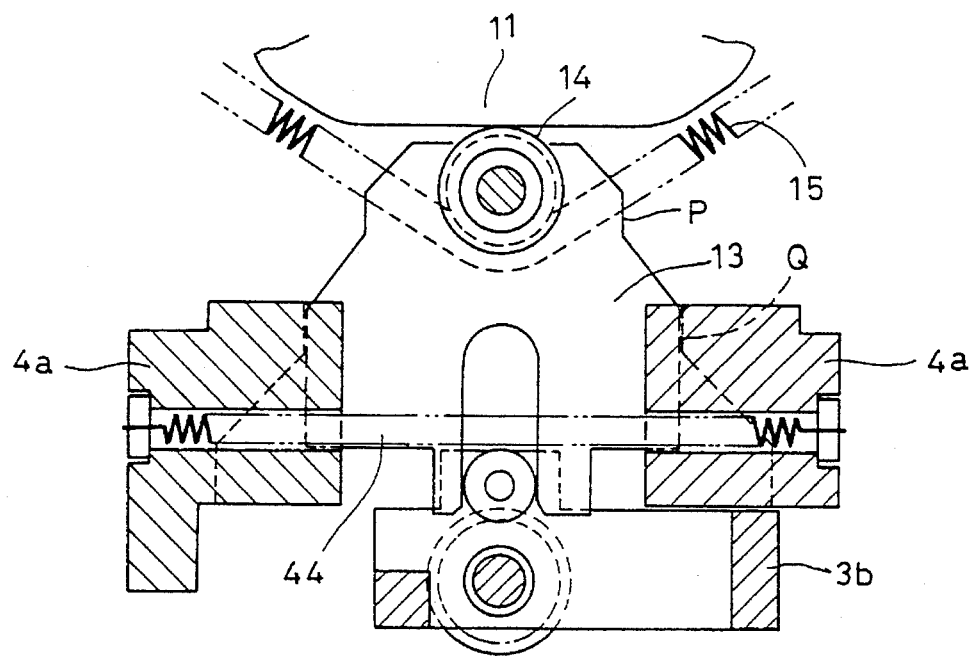
FIG. 9 is a sectional view taken along line IX—IX of FIG. 8.

FIG. 6 shows a sectional view taken along line VI—VI of FIG. 3. It mainly shows one of the cartridge holder 4 and its opening/closing means. FIG. 7 is a side view taken along line VII—VII of FIG. 6. FIG. 8 is a sectional view taken along line VIII—VIII of FIG. 6, i.e. a line somewhat nearer to the center of the rotary table than line VI—VI. FIG. 9 is a sectional view taken along line IX—IX of FIG. 8.

Figure 12:
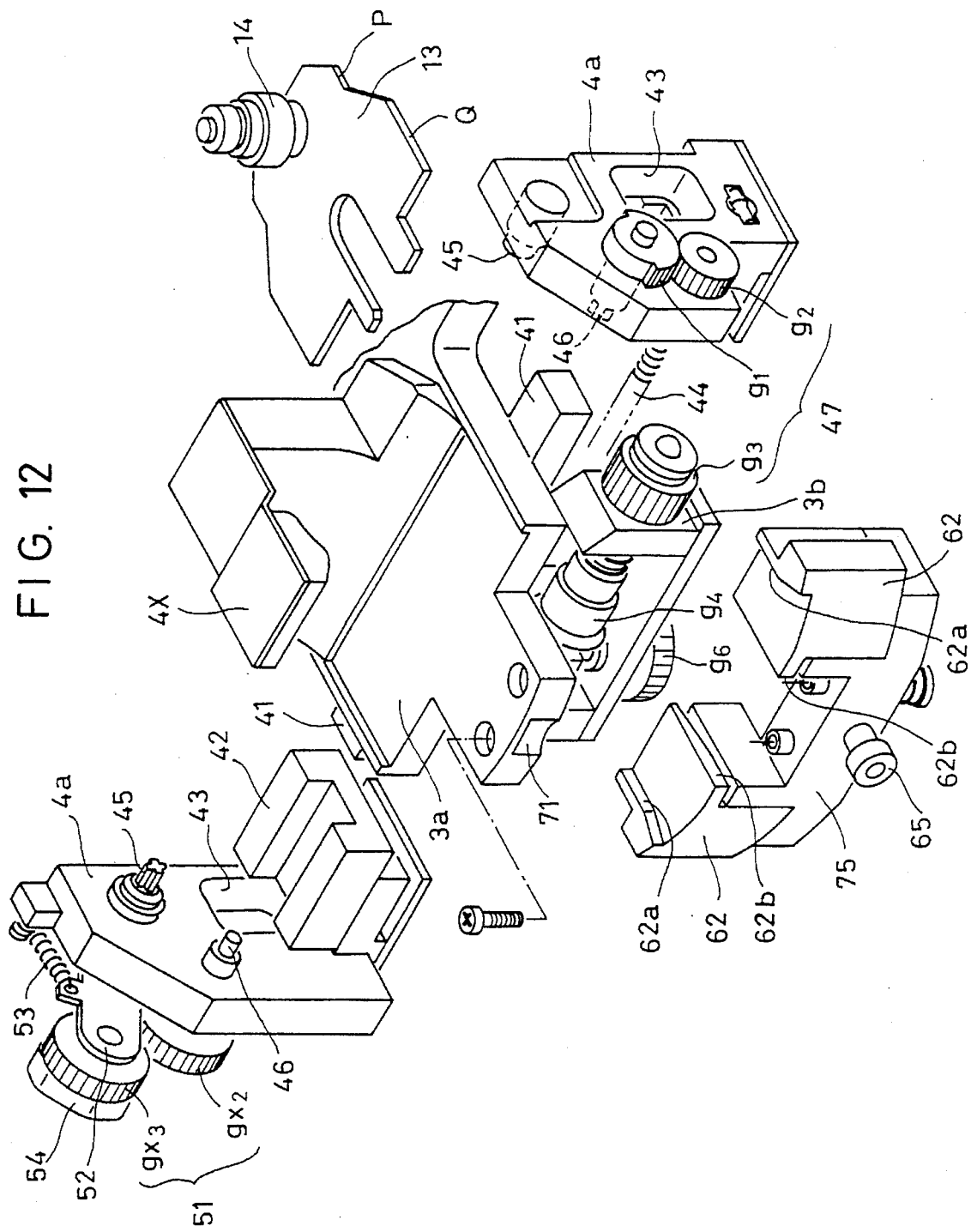
FIG. 12 is an exploded perspective view around the cartridge holder.

As shown in FIG. 12, the cartridge holders 4 are mounted on the rotary table 3 on the respective end portions 3a and resiliently held in position by cartridge pressers 4X. A cartridge X is inserted in and taken out of each cartridge holder 4 by raising and lowering the presser 4X.

The cartridge holder 4 has a pair of vertical side plates 4a to prevent the cartridge X from shifting sideways. Each side plate 4a has a guide 42 fixed to the inner surface thereof and slidable along a slide rail 41 fixed to the bottom of the end portion 3a. As shown in FIG. 8, the side plates 4a are pulled toward each other by a spring 44. Each side plate 4a is formed with an opening 43 in which the slide rail 41 is inserted. A restrictor plate 13 is horizontally movably received in the base of the side plates 4a.

As shown in FIG. 12, each restrictor plate 13 has a narrow portion P and a wide portion Q. As will be seen from FIG. 5, when the rotary table 3 rotates, the contact rollers 14 mounted on the respective restrictor plates 13 roll along the periphery of the cam plate 11.

Thus, due to the irregular contour of the cam plate 11, the respective contact rollers 14 and restrictor plates 13 move radially as the rotary table rotates. Namely, as shown in FIG. 5, at the loading position 5, each restrictor plate 13 is located nearest to the center of rotation of the rotary table, whereas at the other three positions, each restrictor plate 13 is pushed outwardly. When it is pulled toward the center of rotation of the rotary table, the side plates 4a are pushed apart from each other by the wide portion Q of the restrictor plate 13, as shown in FIG. 9.

Figure 10:
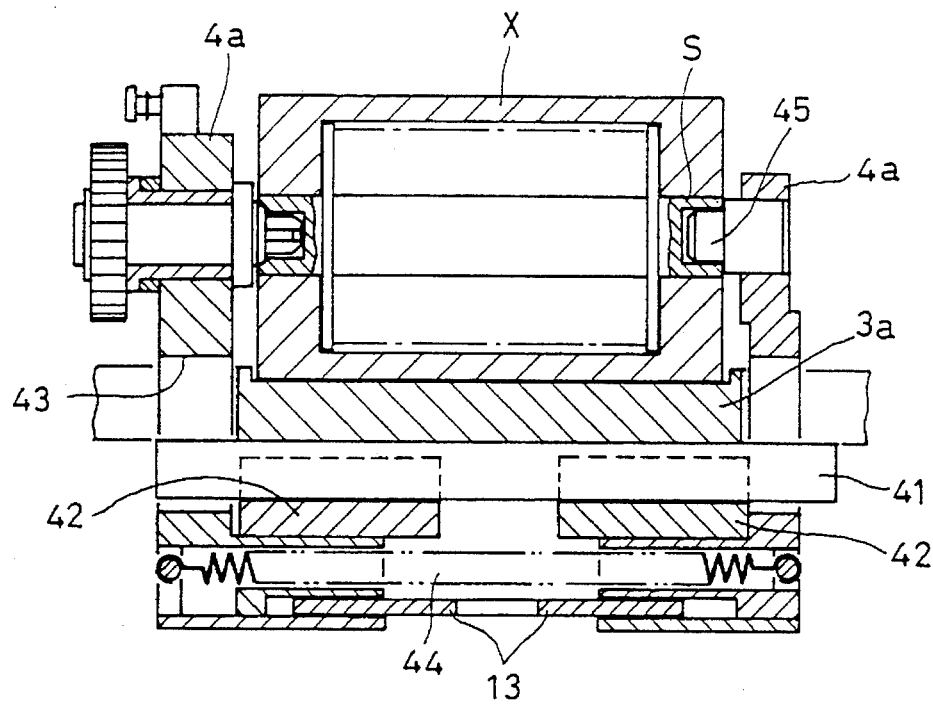
FIG. 10 is a sectional view similar to FIG. 8 but showing a different state.
Figure 11:
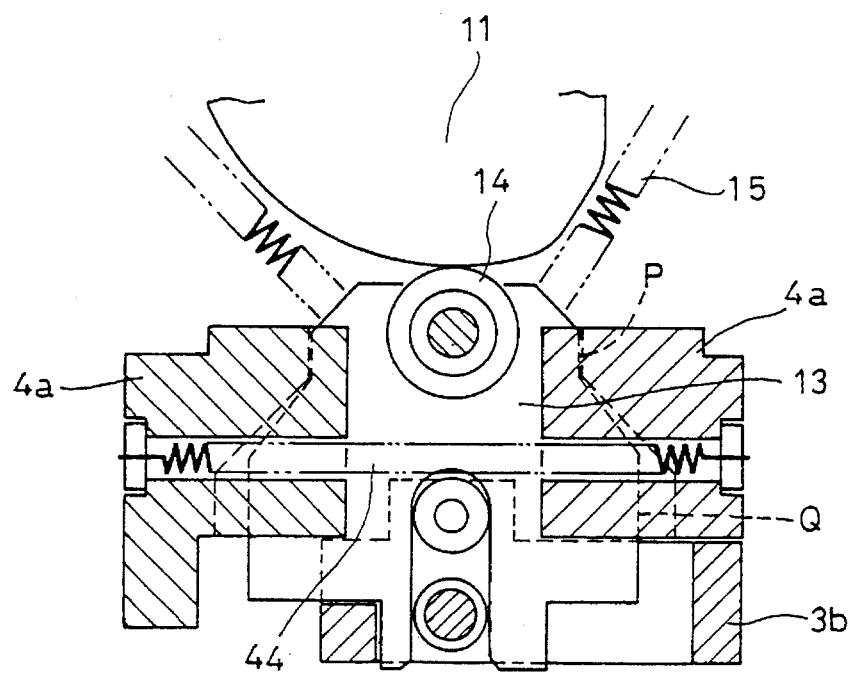
FIG. 11 is a sectional view similar to FIG. 9 but showing a different state.

Now, the cartridge holder 4 at the loading position can accept a cartridge X between its side plates 4a. With the cartridge received in the cartridge holder, the rotary table 3 is rotated, so that the corresponding contact roller 14 and the restrictor plate 13 carrying this roller 14 are pushed radially outward by the cam plate 11. In this state, since the wide portion Q of the restrictor plate 13 is pushed radially outward, the side plates 4a are pulled toward each other by the spring 44 as shown in FIG. 10 until their bottoms come into contact with the narrow portion P of the restrictor plate 13 as shown in FIG. 11. In this state, horizontal rotary shafts 45 carried on the respective side plates 4a engage in holes formed in both ends of the film reel shaft S of the cartridge X.

This is how each cartridge holder 4 is opened and closed automatically by rotating the rotary table 3. As the rotary table rotates, not only the cartridge holders but the cartridges X therein are also opened and closed automatically.

Most ordinary cartridges X have an opening through which a film is inserted, a door for closing the opening, and a shaft S' for pivoting the door as shown in FIG. 6. The side plates rotatably carry horizontal shafts 46 for rotating the shaft S'. Driving force is transmitted to one of the rotary shafts 46 (righthand one in FIG. 6) through a gear train.

The gear train comprises a gear group 47 made up of three gears g1, g2 and g3, and a gear group 49 made up of a bevel gear g4 and a spur gear g5 through which two shafts 48 and 48' are connected together. The gears g1, g2 are secured to the side plate 4a, so that they are movable together with the side plate in the direction of width along the teeth of the gear g3. The gear g3 is horizontally mounted on one end of the shaft 48, which is supported on a bottom support plate 3b integrally provided on each end portion 3a of the rotary table 3. The rack plate 12 shown in FIG. 5 has a toothed end 12a adapted to mesh with a gear g6. Thus, only while the rotary table 3 is rotating with the toothed end 12a meshing with the gear g6, the turning force of the rotary table is transmitted to the rotary shaft 46 through the two gear groups 49 and 47.

As shown in FIG. 5, besides the rack plate 12, another rack plate 16 is secured to the base plate 1. The rack plate 16 also has a toothed end 16a adapted to mesh with the gear g6. When the rotary table 3 begins to rotate after loading a cartridge X into the cartridge holder 4 at the cartridge loading position, the gear g6 (in a gear group 49) corresponding to this cartridge holder 4 engages the toothed end 16a of the rack plate and is rotated. The cartridge X is thus opened.

While the cartridge holder is moving from the printing/exposure position to the loading position, the gear g6 engages the toothed end 12a of the rack plate 12, so that the door of the cartridge X is closed.

Figure 13:
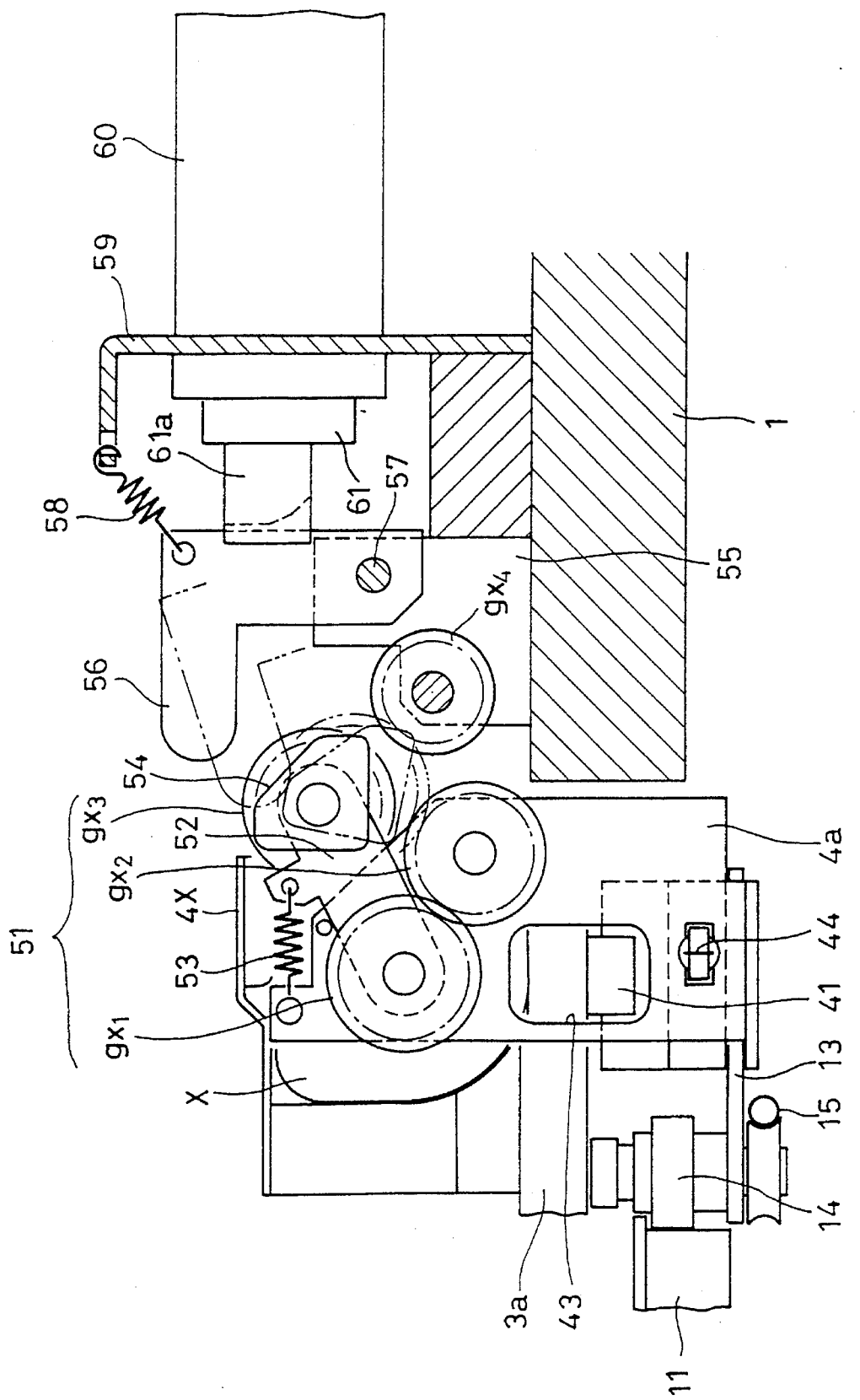
FIG. 13 is a sectional view taken along line XIII—XIII of FIG. 3.

FIG. 13 shows a mechanism for unwinding and rewinding the film from and into the cartridge X at the image data readout position 6 or the printing/exposure position 8.

As shown in FIG. 13, a gear group 51 comprising three gears gX1, gX2 and gX3 are mounted on the outer side of the other side plate 4a (left one in FIGS. 6 and 12). The gear gX1 is coupled to the rotary shaft 45 mounted on the inner side of the side plate 4a. On the outer side thereof, an arm 52 is pivotally mounted on the shaft of the gear gX1. It carries a gear gX2. The arm 52 is normally kept in a raised position by a spring 53.

The arm 52 carries at its end a substantially triangular abutting piece 54 mounted on the shaft of the gear gX3. Thus, by pushing down the abutting piece 54, the gear gX3 is pushed down until it engages the gear gX2 and another gear gX4 mounted on a support 55 secured on the base plate 1. In this state, the gear gX4 is drivingly coupled to the rotary shaft of the cartridge X through the gear group 51, so that the film in the cartridge can be unwound and rewound by turning the gear gX4.

The support 55 also carries a presser plate 56 pivotable about an axis 57 and adapted to push down the gear gX3 to engage it with the gears gX2 and gX4. Normally, the presser plate 56 is kept in a raised position by a spring 58 connected to a mounting plate 59. By activating a solenoid 60 mounted on the mounting plate 59, its piston 61 protrudes, so that the presser plate 56 is pushed by the piston end 61a and inclines to the position shown by two-dot chain line in FIG. 13. Thus, the gears engage in the above-described manner.

Though not shown, the rotary shaft of the gear gX4 carries a pulley connected to a motor through a belt. motor is driven with the gears gX1–gX4 in engagement.

Figure 14:
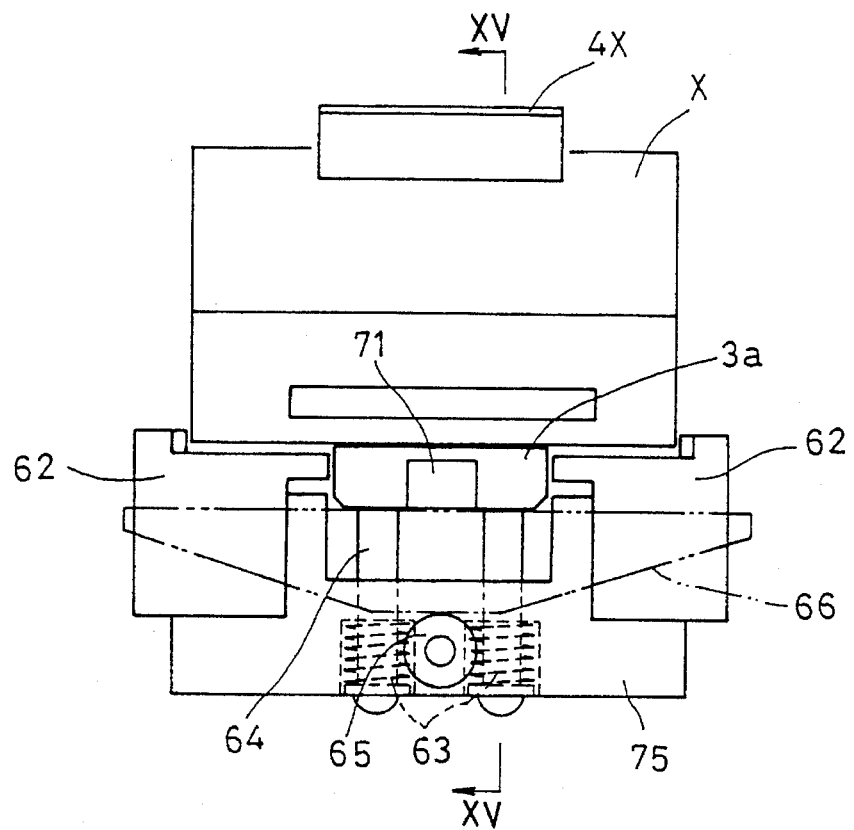
FIG. 14 is a sectional view taken along line XIV—XIV of FIG. 3.
Figure 15:
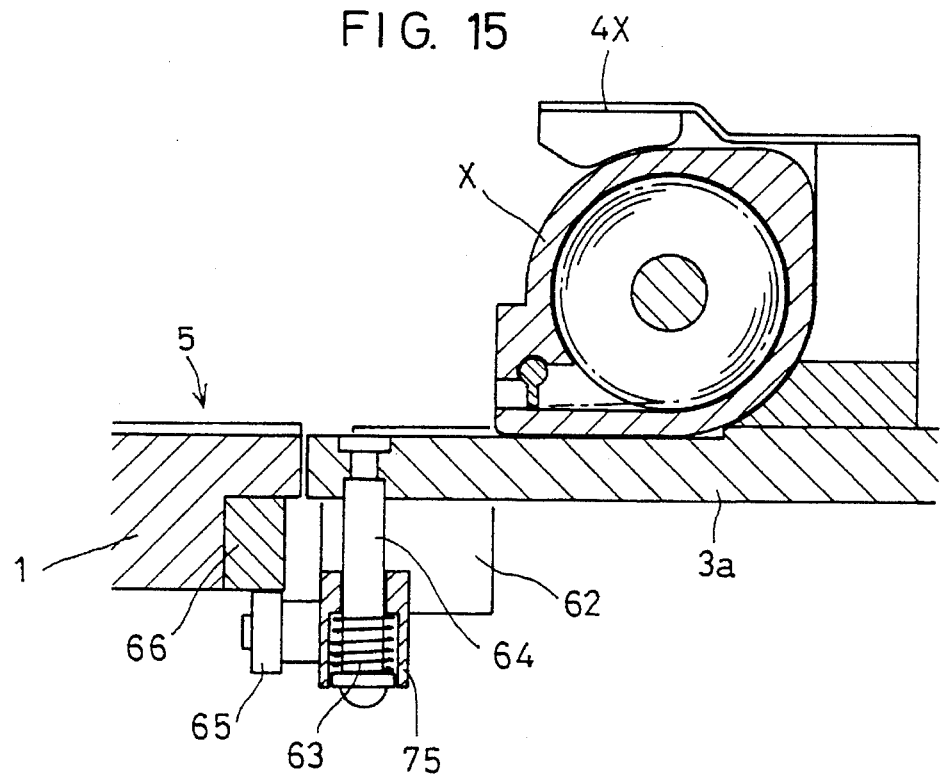
FIG. 15 is a sectional view taken along line XV—XV of FIG. 14.

Now description is made of the cartridge/film guide means. FIG. 14 is a side view taken along line XIV—XIV of FIG. 3, showing the area near the cartridge loading position 5. FIG. 15 is a section taken along line XV—XV of FIG. 14.

Figure 16:
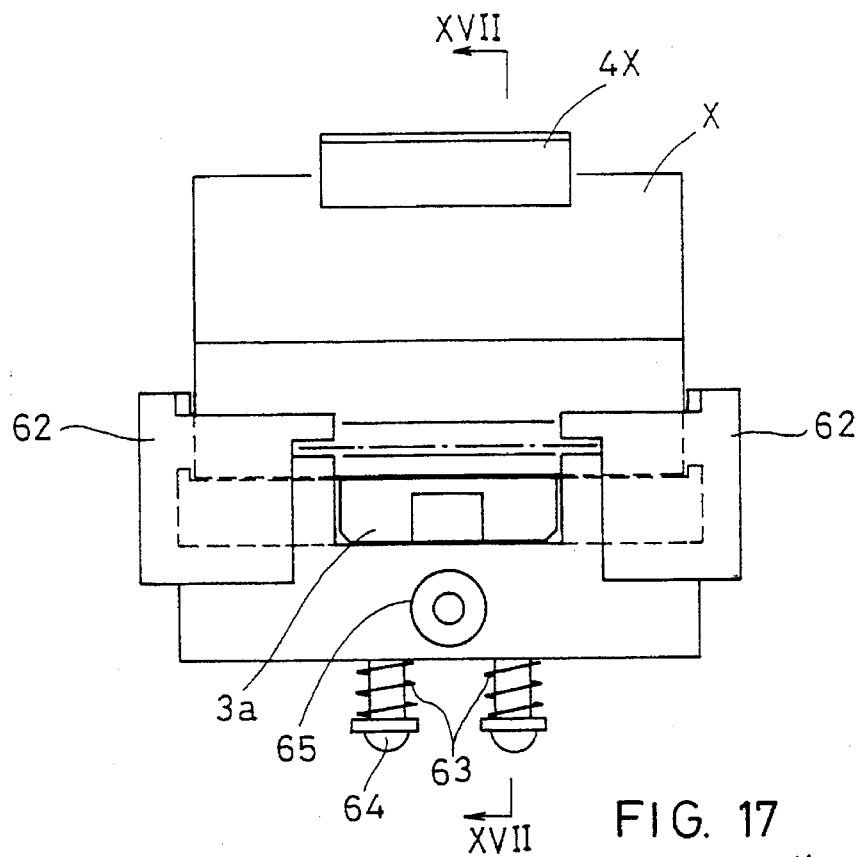
FIG. 16 is a sectional view corresponding to FIG. 14.
Figure 17:
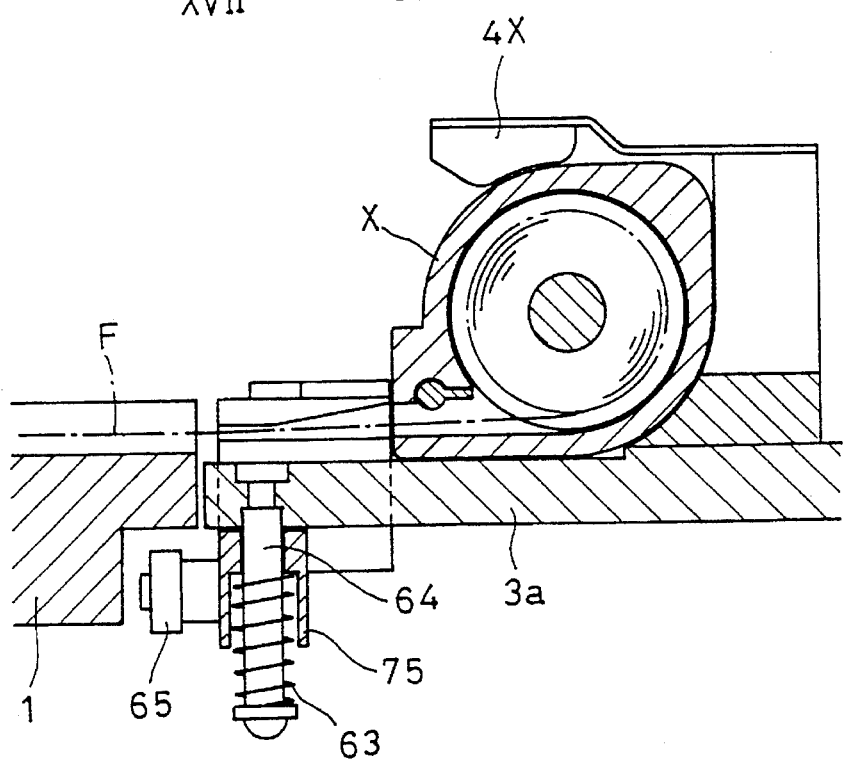
FIG. 17 is a sectional view corresponding to FIG. 15.

As shown in FIG. 12, a rocking means comprising a balance-shaped block 75 and guide pieces 62 mounted on both ends of the block 75 is mounted on the back of each end portion 3a of the rotary table 3. More specifically, the block 75 is vertically movably suspended by slide pins 64 through springs 63 received in holes formed in the bottom thereof (FIG. 14). While only the weight of the rocking means is acting on the springs 63, the rocking means is pushed up by the springs 63 to the highest position so that the guide pieces 62 will protrude from the cartridge guideway as shown in FIGS. 16, 17.

As shown in FIGS. 14 and 15, the block 75 carries a roller 65 at its front end. A substantially triangular (as shown by two-dot line in FIG. 14) cam 66 is mounted on the bottom of the base plate 1 at the cartridge loading position 5 as shown in FIGS. 1 and 3. The cam 66 is the thickest at the center of the guideway and tapers toward both sides.

When the rotary table 3 rotates and each end portion 3a comes to the loading position, the roller 65 and thus the rocking means are pushed down by the cam 66 while compressing the springs 63 until the tops of the guide pieces 62 become flush with the cartridge guideway. In this state, ribs 62a formed on the guide pieces 62 serve as a guide for the cartridge to be fed along the guideway. When the rotary table 3 is rotated again after loading the cartridge into the holder, the rollers 65 move to the thinner portion of the cam 66, so that the block 75 and the guide pieces 62 rise gradually, urged by the springs 63. When the cartridge holder comes out of the cartridge loading position, the roller 65 completely gets out of contact with the cam, so that the guide pieces 62 protrude from the cartridge guideway. Thus, at the image data readout position 6 and the printing/exposure position 8, the guide pieces 62 serve to keep the cartridge X from being pulled out of the cartridge holder, while the ribs 62a serve as a film guide.

Now referring back to FIG. 1, in the intermediate position 7, located between the image data readout position 6 and the printing/exposure position 8, is a locking means 17 for temporarily locking the rotary table 3 when the respective cartridge holders are at the cartridge loading position 5, image data readout position 6, and printing/exposure position 8.

As shown in FIG. 3, the locking means 17 comprises an arm 17a mounted on the base plate 1 so as to be pivotable about a pin 17b, a spring 17c biasing the arm 17a so that its free end is directed toward the center of the rotary table 3, and a roller 17d mounted on the free end of the arm 17a and adapted to engage in a recess 71 formed in the end face of the end portion 3a (see FIG. 12) to lock the rotary table 3.

As shown in FIG. 1, an optical sensor 73 is attached to the bottom of a support plate 72 secured to the end of the arm 9a of the rotation support unit 9. Opposite to the sensor 73, four detector plates 74 are provided on the top end of the rotary shaft 9c (see FIG. 4). When the sensor 74 detects each detector plate, it deactivates the motor of the driving unit 10 to stop the rotary table 3. At the same time, the rotary table 3 is temporarily locked in position by the locking means 17.

Cartridges X may be loaded into cartridge holders at the cartridge loading position in many different ways. For example, cartridges may be manually loaded one by one or may be loaded continuously with an automatic loading device.

According to the present invention, there is no need to mount separate driving motors on the rotary table to feed and hold cartridges and to open and close doors of cartridges. All the members of the printer can be driven mechanically, so that the driving unit for driving the rotary table is extremely simple in structure.

Also, it is possible to read image data from one film while printing another film. The driving force for driving the rotary table is used to feed and hold cartridges and to open and close doors of cartridges. All the members of the printer can be driven mechanically, so that the printer operates with extremely high efficiency. The rotary table is simple, compact and inexpensive.

According to the present invention, it is possible to use an external driving unit to unwind and rewind films from and into cartridges. This makes it possible to further simplify the structure and reduce the size of the rotary table.

According to the present invention, the cartridge/film guide means are provided at the cartridge loading end. At the necessary position(s), cartridges can be loaded onto or detached from the rotary table using this guide means as a cartridge guide. At other positions, this guide means serves as a guide for a film being unwound from or rewound into cartridges, while keeping the cartridge from coming out of the cartridge holder. The driving force for driving the rotary table is also used to retain cartridges in cartridge holders. The parts forming the rotary table are thus all mechanical, so that no electric wires for connection are needed.

What is claimed is:

1. A method of printing films with a plurality of cartridge holders for holding cartridges each accommodating a film provided on a rotary table, said method comprising the steps of feeding films from the respective cartridges into an image data readout unit and a printing/exposure unit arranged along a straight line passing the center of said rotary table to read out image data on one film and simultaneously print another film, rewinding said films into the cartridges, and feeding the cartridges to the next stations, wherein the driving forces necessary to open and close the cartridges, feed and stop the cartridges, and open and close the doors of cartridge holders are derived from the driving force for driving said rotary table.

2. A device for printing films comprising a rotary table, an image data readout unit and a printing/exposure unit arranged along a straight line passing the center of said rotary table, said rotary table having a rotary-drive unit for converting an external force to a force for rotating said rotary table, and a plurality of cartridge holders for housing cartridges each containing a film, said each cartridge holder comprising a pair of side plates for holding a cartridge therebetween, a means for moving said side plates toward and away from each other, and a means provided on said side plates for opening and closing a door of each cartridge, wherein the driving force for driving said rotary-drive unit is also used to drive said means.

3. A device for printing-films as claimed in claim 2 wherein said side plates carry a driving means for unwinding and rewinding films from and into cartridges, said driving means being driven by an external drive means through a transmission means which engages at a predetermined position.

4. A device for printing films as claimed in claim 2 wherein a cartridge/film guide means is provided at a cartridge loading position on said rotary table, and wherein the driving force for driving said rotary table is also used to drive said guide means.

5. A device for printing films as claimed in claim 3 wherein a cartridge/film guide means is provided at a cartridge loading position on said rotary table, and wherein the driving force for driving said rotary table is also used to drive said guide means.

* * * * *